(12) United States Patent
Subrahmanyan

(10) Patent No.: US 6,898,042 B2
(45) Date of Patent: May 24, 2005

(54) SLIDER LEVEL MICROACTUATOR WITH INTEGRATED FLY CONTROL

(75) Inventor: Pradeep K. Subrahmanyan, Hillsboro, OR (US)

(73) Assignee: Seagate Technology LLC, Scotts Valley, CA (US)

( * ) Notice: Subject to any disclaimer, the term of this patent is extended or adjusted under 35 U.S.C. 154(b) by 354 days.

(21) Appl. No.: 10/140,208

(22) Filed: May 6, 2002

(65) Prior Publication Data

US 2002/0181140 A1 Dec. 5, 2002

Related U.S. Application Data

(60) Provisional application No. 60/293,284, filed on May 23, 2001.

(51) Int. Cl.[7] .............................................. G11B 21/02
(52) U.S. Cl. .................... 360/75; 360/78.01; 360/294.3
(58) Field of Search ............................... 360/75, 77.01, 360/77.02, 78.01, 78.04, 78.05, 294.3–294.5, 76; 369/132, 126; 310/156.29, 152, 309; 361/283; 29/607, 602.1, 603.01, 603.03, 603.16

(56) References Cited

U.S. PATENT DOCUMENTS

| 5,377,058 | A | | 12/1994 | Good et al. .................... 360/75 |
| 6,198,606 | B1 | | 3/2001 | Boutaghou et al. ...... 360/294.3 |
| 6,335,850 | B1 | * | 1/2002 | Dunfield et al. ......... 360/294.5 |
| 6,359,757 | B1 | * | 3/2002 | Mallary .................... 360/294.3 |
| 6,611,399 | B1 | * | 8/2003 | Mei et al. ................. 360/234.7 |
| 6,731,471 | B1 | * | 5/2004 | Bonin ....................... 360/294.3 |

OTHER PUBLICATIONS

"Design of Permanent Multipole Magnets with Oriented Rare Earth Cobalt Material" by K. Halbach, *Nuclear Instruments and Methods 169*, pp. 1–10, Aug. 1979.
"Application of permanent magnets in accelerators and electron storage rings (invited)" by K. Halbach, *Synchrotron Radiation and Magnetism*, Journal of Applied Physics, No. 57, pp. 3605–3608, Apr. 15, 1985.
"Magnet Arrays for Syncronous Machines" by D. Trumper et al., IEEE Ind. Appl. Soc. Annual Meeting, Oct. 1993.
"Permanent–Magnet Synchronous Motors and Associated Power Electronics for Direct–Drive Vehicle Propulsion" thesis of J. Ofori–Tenkorang, Massachusetts Institute of Technology, Sep. 1996.

* cited by examiner

*Primary Examiner*—Sinh Tran
*Assistant Examiner*—Jason Olson
(74) *Attorney, Agent, or Firm*—Westman, Champlin & Kelly

(57) ABSTRACT

A microactuator comprises a stator, a rotor and an operator coupling the rotor to the stator. The operator comprises a four-block magnet array supported by either the stator or rotor, and first and second coils supported by the other of the stator or rotor. Current in one coil alters magnetic flux linkage to move the rotor along a first axis. Current in the other coil alters magnetic flux linkage to move the rotor along a second axis orthogonal to the first axis. The microactuator is applied to the slider of a disc drive to position the head at a selected flying distance adjacent the disc medium, and to position the head relative to a track on the medium.

15 Claims, 4 Drawing Sheets

SLIDER LEVEL MICROACTUATOR WITH INTEGRATED FLY CONTROL

CROSS-REFERENCE TO RELATED APPLICATION

This application claims priority of U.S. Provisional Application No. 60/293,284 filed May 23, 2001 for "Slider Level Microactuator With Integrated Fly Height Control".

FIELD OF THE INVENTION

This invention relates to microactuators for finely positioning a transducing head relative to a desired track in a disc storage device, and particularly to a microactuator that supports the slider and provides fly height control as well as fine positioning.

BACKGROUND OF THE INVENTION

As the aerial storage densities of disc drives increases, the distance between adjacent concentric tracks decreases. Decreasing track spacing increases the difficulty of precisely positioning the transducing head over a selected track on the medium. Most disc drives employ a voice coil motor (VCM) that rotates the actuator assembly of the disc drive to position the head relative to the track. However, resonant modes of vibration in the actuator make it increasingly difficult to accurately follow the tracks, particularly as track spacing decreases. Consequently, dual-stage actuation has been employed using the VCM to coarsely position the arm and transducer relative to a selected track, and using a microactuator to finely position the transducer relative to the arm to thereby finely position the transducer relative to the selected track.

The microactuator comprises a stator and a rotor. In one form, commonly referred to as a slider level microactuator, the stator is mounted to the suspension, and the rotor supports the slider. Other forms of microactuator include arm level microactuators in which both the stator and rotor are embedded in the arm to deform the arm to finely position the transducer, and suspension level microactuators in which the stator is mounted to the arm and the rotor supports the suspension. Slider level microactuators are of minimal mass and can be modeled as single degree of freedom spring mass damper systems over a wide range of frequencies. Hence, slider based microactuators are easily adapted for use in disc drives. While the present invention will be described in relation to slider level microactuators, the principles of the present invention can be adapted to arm level and suspension level microactuators as well.

As track densities continue to increase, the fly height, and particularly fly height variations, of the slider become increasingly important. More particularly, the transducers must be increasingly smaller (narrower) as track spacing increases and track widths decrease. To accommodate signal and noise issues associated with smaller track widths, the slider and transducer must "fly" at a lower fly height and with less fly height variation. Accordingly, there is an increasing need for maintaining a smaller and a constant air gap between the slider and the disc.

Currently, the air gap is maintained passively through the use of the suspension and aerodynamic design of the slider forming the air bearing. Requirements for increased aerial densities and disc speeds and decreased fly heights render passive control of the fly height increasingly difficult and less reliable. The present invention provides a solution to this and other problems, and offers other advantages over the prior art.

SUMMARY OF THE INVENTION

The present invention is directed to an integrated slider level microactuator that combines both cross track motion over the disc surface for track following and positioning purposes, as well as head motion orthogonal to the disc surface for fly height control.

In one embodiment, a microactuator comprises a stator, a rotor, and an operator coupled to the stator and rotor to independently move the rotor in at least two substantially orthogonal directions relative to the stator. The operator comprises an arrangement of magnets mounted to one of the stator and rotor and a winding or coil system mounted to the other of the stator and rotor. Current in the winding alters magnetic flux linkage with at least part of the arrangement of magnets to selectively move the rotor in two orthogonal directions.

In some embodiments the magnet system is a four-block magnet array, such as a Halbach array, having two vertically oriented blocks and two horizontally oriented blocks. The winding system comprises first and second coils confronting the four-block magnet array and arranged to independently carry current.

In other embodiments, a data storage device comprises a rotatable storage medium for storing data along concentric tracks on a surface of the medium. A transducer is supported by a slider to transfer data between the transducer and the medium. An actuator assembly supports the slider adjacent the medium at a fly height from the surface of the medium, and includes an actuator arm, a suspension supported by the actuator arm, a microactuator coupling the slider to the suspension, and an actuator for moving the actuator arm to thereby move the transducer across tracks on the storage medium. The microactuator comprises a rotor supporting the slider, a magnet array supported by the rotor, a stator supported by the suspension and first and second coils supported by the stator. The first coil is operatively coupled to the magnet array so that current in the first coil causes a Lorentz force density that moves the rotor in a direction across tracks on the storage medium. The second coil is operatively coupled to the magnet array so that current in the second coil causes a Lorentz force density that moves the rotor to adjust the fly height.

In another embodiment of the invention, the fly height of a slider carrying a transducer at a flying distance adjacent a movable storage medium is adjusted. A microactuator is coupled to an actuator arm to support a slider adjacent the medium. The microactuator is operated in a first mode to move the slider along a first axis orthogonal to the medium to position the transducer at a selected flying distance adjacent the medium. The microactuator is operated in a second mode to move the slider along a second axis orthogonal to the first axis to adjusting a position of the transducer relative to a track on the medium.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
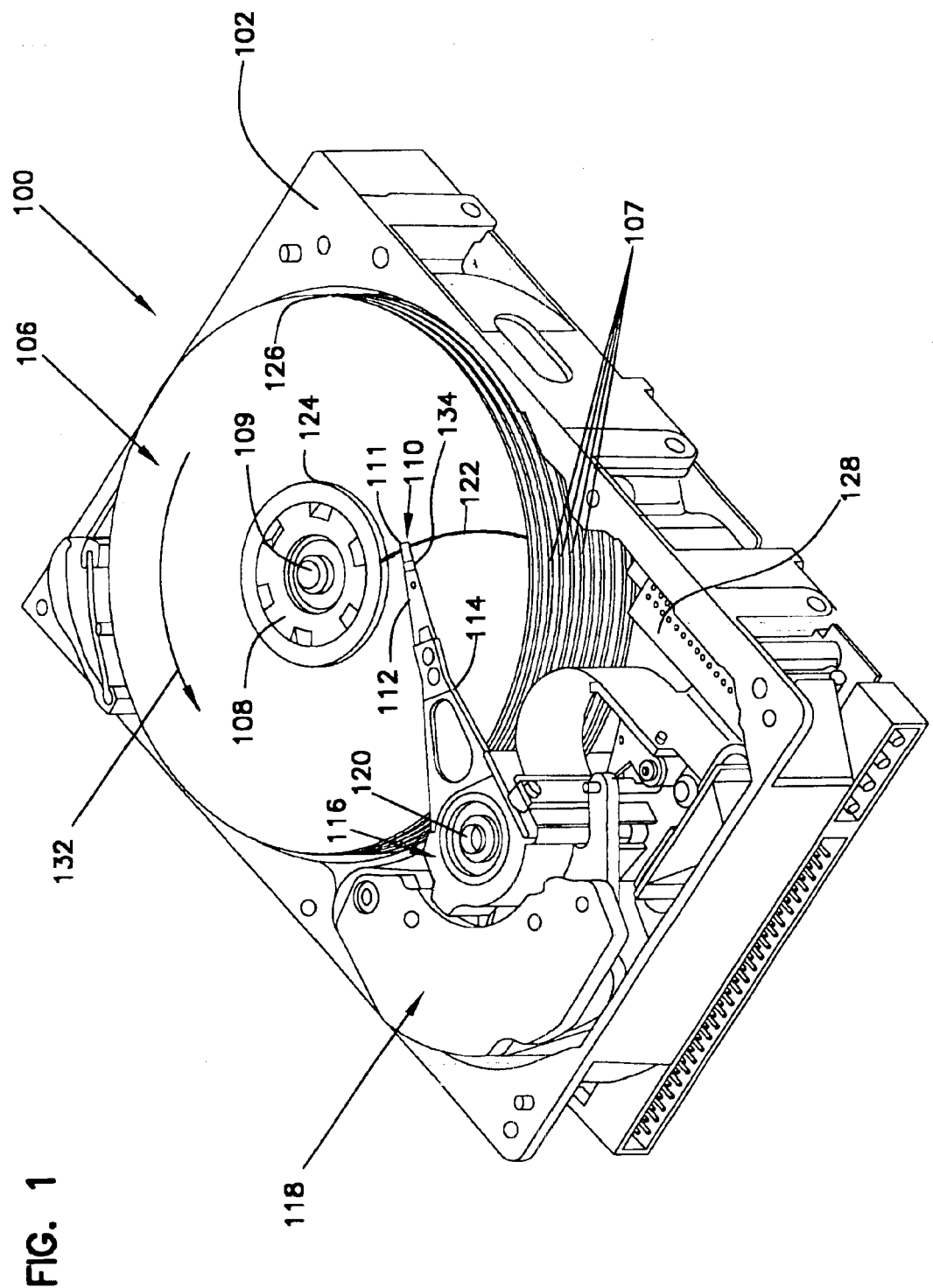
FIG. 1 is a perspective view of a disc drive in which aspects of the present invention may be practiced.

FIG. 1 is a perspective view of a disc drive 100 in which the present invention is useful. Disc drive 100 includes a housing with a base 102 and a top cover (not shown). Disc drive 100 further includes a disc pack 106, which is mounted on a spindle motor (not shown) by a disc clamp 108 for rotation in the direction of arrow 132. Disc pack 106 includes a plurality of individual discs 107, which are mounted for co-rotation about central axis 109. Each disc surface has an associated slider 110 that is mounted in disc drive 100 for communication with the confronting disc surface. Slider 110 is arranged to fly above the associated disc surface of an individual disc of disc pack 106, and carries a transducing head 111 arranged to write data to, and read data from, concentric tracks on the confronting disc surface. In the example shown in FIG. 1, each slider 110 is supported by a microactuator 134, which in turn is supported by a respective suspension 112. Suspensions 112 are in turn attached to respective track accessing arms 114 of an actuator 116. Actuator 116 is driven by a voice coil motor (VCM) 118 to rotate the actuator, and its attached arms 114, suspensions 112 and sliders 110, about a pivot shaft 120. Rotation of actuator 116 moves the heads 111 along an arcuate path 122 to coarsely position the heads adjacent desired data tracks between a disc inner diameter 124 and a disc outer diameter 126. Operation of microactuator 134 moves slider 110 radially relative to the respective disc 107 to finely position the respective head 111 over the desired data track.

Voice coil motor 118 is operated by position signals from servo electronics included on circuit board 128, which in turn are based on error signals generated by heads 111 and position signals from a host computer (not shown). Similarly, each microactuator 134 is operated by respective position signals from the servo electronics to finely position the head 111 relative to the desired track. Read and write electronics are also included on circuit board 128 to supply signals to the host computer based on data read from disc pack 106 by the read portions of heads 111, and to supply write signals to the write portions of heads 111 to write data to the discs.

Figure 2:
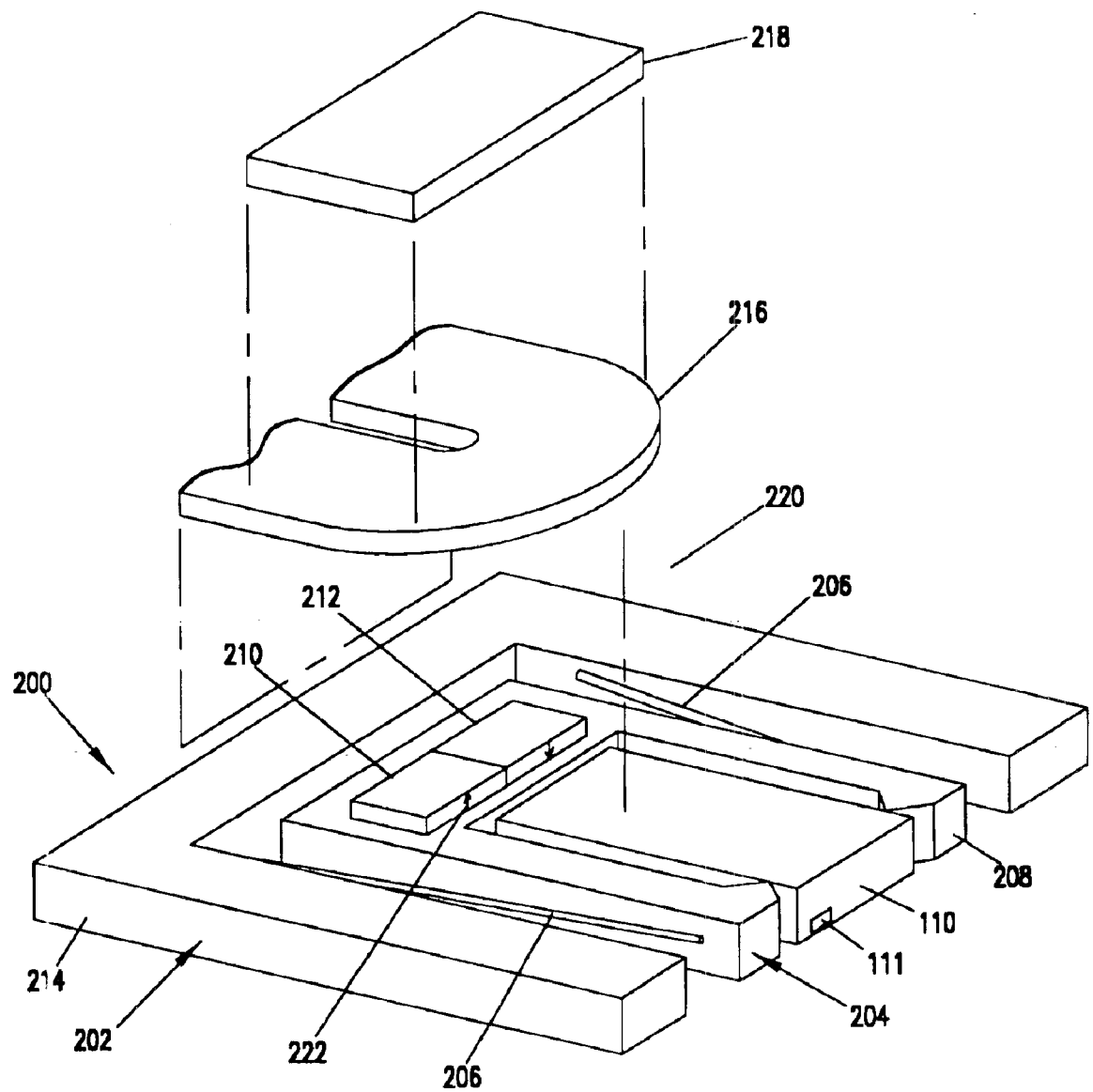
FIG. 2 is an exploded perspective view of a prior art microactuator.
Figure 3:
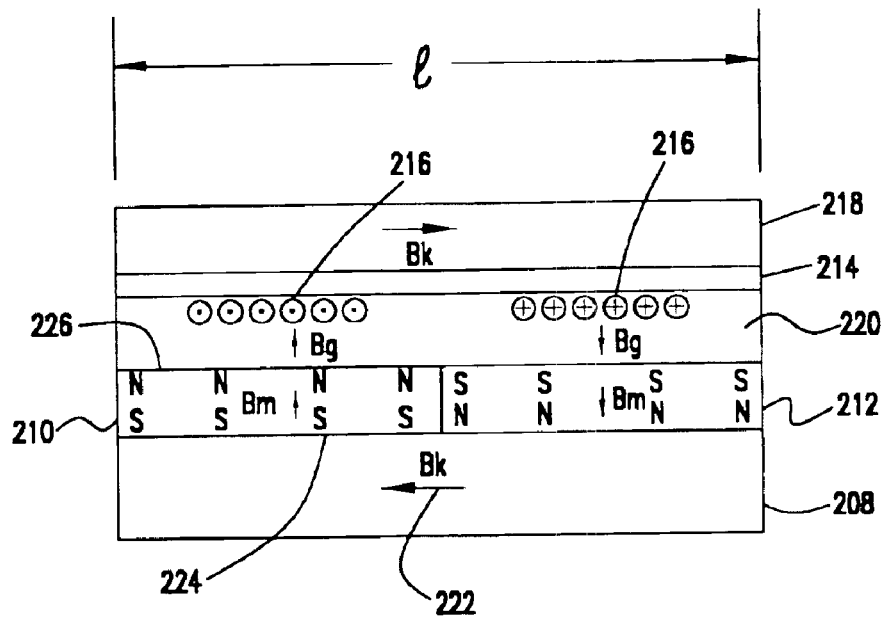
FIG. 3 is a diagram of the magnetic circuit of the prior art microactuator.

FIGS. 2 and 3 illustrate portions of a microactuator 200 that employs a vertical magnet array. The microactuator illustrated in FIGS. 2 and 3 is described in U.S. Pat. No. 6,198,606 granted Mar. 6, 2001 to Boutaghou et al. for "Disc Drive Actuation System having an Injected Molded Magnetic Micro-Actuator with Metal Beam Inserts and its Method of Fabrication" and assigned to the same Assignee as the present invention, the disclosure of which is incorporated herein by reference. Microactuator 200 comprises a stator 202 and rotor 204 that are fastened together by flexible suspension beams 206. Rotor 204 includes a clip 208 that holds and retains slider 110 carrying head 111. Permanent magnets 210 and 212 are mounted to clip 208, and a magnetic keeper (not shown) is supported by clip 208 adjacent the magnets. Magnets 210 and 212 are arranged vertically, that is, one of the magnets 210 is positioned so that magnetic flux is directed upwardly (as shown in FIGS. 2 and 3) from surface 226 (FIG. 3) toward coil 216 and the other magnet 212 is positioned so that magnetic flux is directed downwardly (in FIGS. 2 and 3) from surface 224 toward clip 208. While magnets 210 and 212 are shown as separate magnets, they may be a single magnet. Additionally, while the keeper supported by clip 208 is described as a separate element supported by the clip, the keeper may comprise the clip itself.

Stator 202 includes a housing 214 that is supported by the suspension 112 (FIG. 1) of the disc drive. An electric coil 216 is supported by housing 214 to confront magnets 210 and 212 on clip 208. Magnetic keeper 218 is supported by coil 216 to a complete a magnetic circuit between the keepers on clip 208, magnets 210 and 212, coil 216 and keeper 218.

The magnetic circuit of microactuator 200 may best be explained with reference to FIG. 3. The arrangement is a vertically arranged magnetic circuit formed by a magnetic keeper, such as clip 208, permanent magnets 210 and 212, conductive coil 216, and ferromagnetic keeper 218. Current flowing through coil 216 interacts with the magnetic field in the air gap 220 between magnetic 210 and 212 and coil 216 so that the magnetic flux is oriented in the direction indicated by the arrows 222, where $B_G$ is the flux in the air gap, $B_K$ is the flux in the keepers, and $B_M$ is the flux in the magnets. This interaction causes a force to be exerted on the magnets at 210 and 212 in a lateral direction, that is, across the tracks of the confronting medium. The force is controllable to achieve a high degree of resolution of movement for positioning slider 110 relative to the tracks on disc 107 (FIG. 1).

The fundamental component of the magnetic scalar potentials for the actuator illustrated in FIGS. 2 and 3 in the absence of a ferromagnetic keeper are $$\frac{2}{\pi} F(M_0, \Delta, k_1, z)$$

for the bottom surface 224 of the magnets and $$-\frac{2}{\pi} F(M_0, \Delta, k_1, z)$$

for the top surface 226 of the magnets, where $$F(M_0, \Delta, k_1, z) = -\frac{M_0}{k_1}(1 - e^{-k_1 \Delta})\cos(k_1 z),$$

and where $M_0$ is the fundamental magnetization component of magnets 210 and 212, $\Delta$ is the thickness of the magnets, $k_1$ is the fundamental wave number equal to $$\frac{2\pi}{l},$$

l is the spatial wavelength of the magnetic array, and z is the Z coordinate (direction along the magnetic array).

Figure 5:
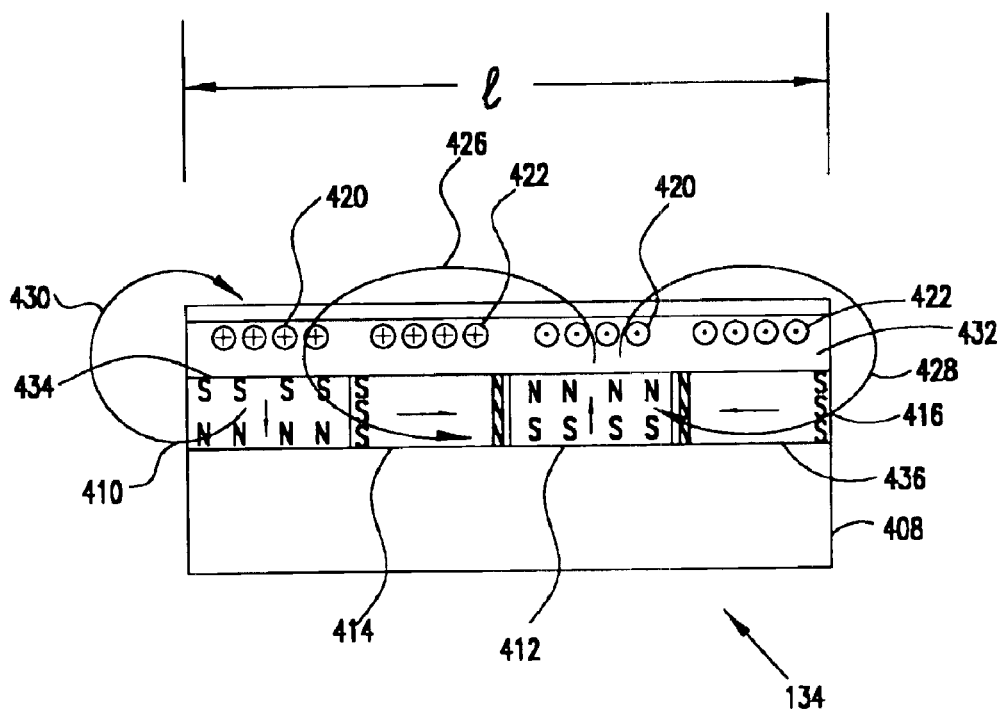
FIGS. 4 and 5 are an exploded perspective view and a diagram of the magnetic circuit of a microactuator according to an embodiment of the present invention.
Figure 4:
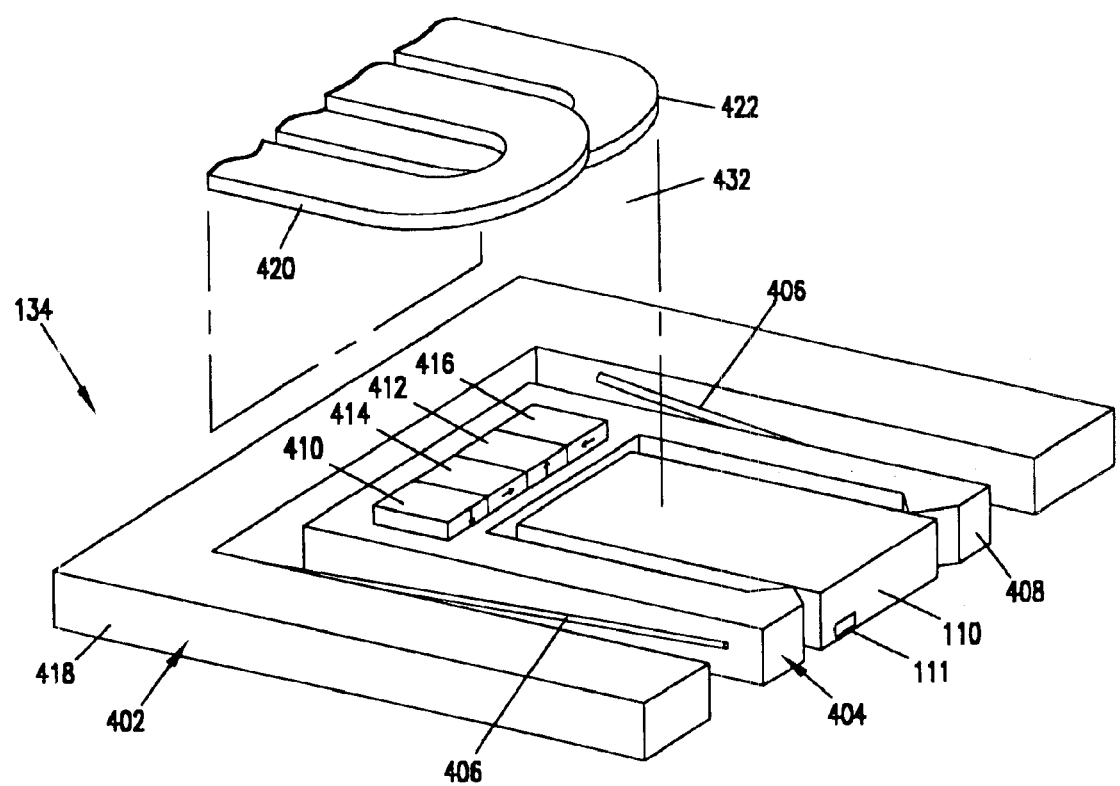

FIGS. 4 and 5 illustrate a microactuator 134 in accordance with an embodiment of the present invention. Microactuator 134 comprises a stator 402 and rotor 404 that are fastened together by flexible suspension beams 406. Rotor 404 includes a non-ferromagnetic clip 408 that holds and retains slider 110 carrying head 111. Permanent magnets 410, 412, 414 and 416 are mounted to clip 408. Magnets 410 and 412 are arranged vertically, that is, one of the magnets 410 is positioned so that permanent magnetic flux is directed downwardly (in FIGS. 4 and 5) from surface 436 (FIG. 5) toward clip 408 and the other magnet 412 is positioned so that permanent magnetic flux is directed upwardly (in FIGS. 4 and 5) from surface 434 toward coil 420 on stator 402.

Magnets 414 and 416 are arranged horizontally, that is, one of the magnets 414 is positioned so that the permanent magnetic flux is directed to the right (in FIGS. 4 and 5) and the other magnet 416 is positioned so that the permanent magnetic flux is directed to the left (in FIGS. 4 and 5). Magnets 410, 412, 414 and 416 are arranged in a manner similar to a four-block Halbach array described in Halbach, "Application of Permanent Magnets in Accelerators and Electron Storage Rings", *Journal of Applied Physics*, Vol. 57, No. 1, pp. 3605–3608, April 1985.

Stator 402 includes a housing 418 that is supported by the suspension 112 (FIG. 1) of the disc drive. A first electric coil 420 is supported by housing 418 to confront magnets 410 and 412 on clip 408 and a second electric coil 422 is supported by housing 418 to confront magnets 414 and 416 on clip 408. As shown in FIG. 5, a first magnetic circuit 426 is formed around one leg of coil 422 through magnets 410, 414 and 412 and both legs of coil 420, a second magnetic circuit 428 is formed around the other leg of coil 422 through magnets 412 and 416 and one leg of coil 420, and a third magnetic circuit 430 is formed through magnet 410 and one leg of coil 420.

Each magnet 410, 412, 414, 416 of the magnet array has a length along the array equal to one-fourth of the spatial wavelength of the magnetic array (¼). Ideally, the magnet array would be an ideal Halbach array with a continuously rotating flux vector over the array length, but the ideal Halbach array is not a practical construction. Instead, the ideal array is approximated using four (or more) magnets achieving (from right to left in FIG. 5), a left-directed flux achieved by magnet 416 for one-fourth of the spatial wavelength, an upward-directed flux achieved by magnet 412 for one-fourth of the spatial wavelength, a right-directed flux achieved by magnet 414 for one-fourth of the spatial wavelength, and a downward-directed flux achieved by magnet 410 for one-fourth of the spatial wavelength. It would be possible to more closely approximate the ideal Halbach magnet array by dividing the array into more magnets, say eight or sixteen, in which case a further improvement in attainable flux would be obtained, as explained below. However, the length of the individual magnets would be reduced to ⅛ or ¹⁄₁₆, as the case may be, and the number of coil legs and signal phases would be increased for the coils associated with the additional magnets, thereby rendering the resulting magnet array costly. Since the gain in attainable flux resulting by further dividing the magnet array beyond four magnets is small, it is preferred to employ a magnet array of four magnets.

The magnetic circuits of microactuator 134 may best be explained with reference to FIG. 5. The vertically arranged magnetic circuits formed by permanent magnets 410 and 412 and conductive coil 420 operate in the same manner as described in connection with FIGS. 2 and 4. Hence, current flowing through coil 420 interacts with the magnetic field in the air gap 432 between magnets 410 and 412 and coil 420. This interaction generates a Lorentz force which is exerted on magnets 410 and 412 in a lateral direction, that is, across the tracks of the confronting medium. The strength and direction of the force on magnets 410 and 412 are controlled by controlling the strength and direction of the current in coil 420. The Lorentz force is translated as movement of slider 110 (FIG. 1), so the amount and direction of lateral positioning of slider 110 relative to the tracks on disc 107 (FIG. 1) is controllable to a high degree of resolution.

Magnets 414 and 416 and coil 422 operate such that current flowing through coil 422 interacts with the magnetic field in circuits 426 and 428 to create a Lorentz force on magnets 414 and 416 in a vertical direction, that is, toward or away from the tracks of the confronting medium. The strength and direction of the force on magnets 414 and 416 are controlled by controlling the strength and direction of the current in coil 422. The force results in a movement of the slider 110 (FIG. 1), so the amount and direction of vertical positioning of slider 110 relative to the surface of disc 107 (FIG. 1) is controllable to a high degree of resolution.

The magnetic array of the microactuator illustrated in FIGS. 4 and 5 is similar to a four-block Halbach array and exhibit fundamental components of magnetic scalar potentials of $$\frac{2\sqrt{2}}{\pi} F(M_0, \Delta, k_1, z)$$

for the top surface 434 of the magnets and 0 for the bottom surface 436 of the magnets. Consequently, the magnetic flux attainable by the magnet array of the microactuator 134 is greater than the flux attainable by a conventional magnet array, such as that illustrated in FIGS. 2 and 3, by a factor of √2. Moreover, the flux is restricted to one side of the microactuator so that flux does not appreciably enter clip 408. This feature is advantageous where rare earth permanent magnets are employed in the microactuator in close proximity to a magnetic recording medium.

An ideal Halbach magnet array exhibits a fundamental component of magnetic scalar potential of $F(M_0,\Delta,k_1,z)$ for the top surface (such as surface 434) of the magnets and 0 for the bottom surface (such as bottom surface 436) of the magnets. Hence the four-block array described herein achieves about 90% of the achievable flux of an ideal Halbach array, whereas a conventional array as illustrated in FIGS. 2 and 3 can achieve only $$\frac{2}{\pi},$$

or about 64%, of the achievable flux of an ideal Halbach array. As described above, it is possible to further segment the magnet array into eight or sixteen magnets to more closely approximate the ideal Halbach magnet array. However, the cost of further segmenting the array and adding additional coils with phased signals might not justify the advantage derived from the increased available flux over the four-block array described herein.

The present invention thus provides a microactuator employing a four-block Halbach magnet array. Separate coils linking the flux of the alternate magnet blocks of the array permit positioning of the rotor, and of the slider and transducer coupled to the rotor, to fine position the transducer to a selected track on a confronting disc surface, and to adjust the fly height of the transducer to minimize fly height and variations in fly height.

Stated another way, a microactuator, such as microactuator 134, comprises a stator, such as stator 402, a rotor, such as rotor 404, and an operator coupled to the rotor and stator to move the rotor relative to the stator. The operator comprises at least one magnet, such as magnet 410–416, supported by one of the stator and rotor, and a winding means, such as coils 420 and 422, supported by the other of the stator and rotor. Flux generated by current in the winding means couples with the magnetic flux in the magnets to independently move the rotor in at least two substantially orthogonal directions.

In some embodiments the magnet is a four-block magnet array, such as a Halbach array, having two vertically oriented blocks, such as blocks 410 and 412, and two horizontally oriented blocks, such as blocks 414 and 416. The operator means comprises first and second coils, such as coils 420 and 422, confronting the four-block magnet array and arranged to independently carry current.

In other embodiments, a data storage device, such as disc drive 100, comprises a rotatable storage medium, such as discs 107, for storing data along concentric tracks on a surface of the medium. A transducer, such as transducer 111, is supported by a slider, such as slider 110, to transfer data between the transducer and the medium. An actuator assembly supports the slider adjacent the medium at a fly height from the surface of the medium, and includes an actuator arm, such as arm 114, a suspension, such as suspension 112, supported by the actuator arm, a microactuator, such as microactuator 134, coupling the slider to the suspension. An actuator, such as voice coil motor 116, moves the actuator arm to thereby move the transducer across tracks on the storage medium. The microactuator comprises a rotor, such as rotor 404 supporting the slider, a magnet, such as magnets 410–114, supported by the rotor, a stator, such as stator 402, supported by the suspension and first and second coils, such as coils 420 and 422, supported by the stator. The first coil (e.g., coil 420) is operatively coupled to the magnet (e.g., blocks 410 and 412) so that current in the first coil alters magnetic flux linkage with the magnet to move the rotor in a direction across tracks on the storage medium. The second coil (e.g., coil 422) is operatively coupled to the magnet (e.g., blocks 412 and 414) so that current in the second coil alters magnetic flux linkage with the magnet to move the rotor to adjust the fly height.

In another embodiment, adjustment of the fly height of a slider, such as slider 110, is performed, where the slider carries a transducer, such as transducer 111, at a flying distance adjacent a movable storage medium, such as disc 107. A microactuator, such as microactuator 134 is coupled to the actuator arm, such as the actuator assembly comprising arm 114, suspension 112 and slider 110, that supports the slider adjacent the medium. The microactuator is operated in a first mode to move the slider along a first axis orthogonal to the medium to position the transducer at a selected flying distance adjacent the medium. The microactuator is operated in a second mode to move the slider along a second axis orthogonal to the first axis to adjusting a position of the transducer relative to a track on the medium.

Although the present invention has been described with reference to a four-block magnet array, those skilled in the art will recognize that the present invention may be practiced with other system modifications, including but not limited to eight- and sixteen block arrays and systems employing other microactuator technologies, such as arm-level and suspension-level microactuators.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, particular elements may vary depending on the particular application for the microactuator while maintaining substantially the same functionality without departing from the scope and spirit of the present invention. In addition, although the invention is described herein is directed to magnetic storage devices, it will be appreciated by those skilled in the art that the teachings of the present invention can be applied to other devices requiring fly height and position control, such as optical storage devices, without departing from the scope and spirit of the invention.

What is claimed is:

1. A data storage device comprising:
   rotatable storage medium for storing data along concentric tracks on a surface of the medium;
   a transducer supported by a slider to transfer data between the transducer and the medium; and
   an actuator assembly supporting the slider adjacent the medium at a fly height from the surface of the medium, the actuator assembly comprising an actuator arm, a suspension supported by the actuator arm, a microactuator coupling the slider to the suspension, and an actuator for moving the actuator arm to thereby move the transducer across tracks on the storage medium, the microactuator comprising:
   a rotor supporting the slider,
   a stator supported by the suspension,
   at least one magnet supported by one of the rotor or stator,
   first and second coils supported by the other of the rotor or stator, the first coil being operatively coupled to at least one magnet so that current in the first coil alters magnetic flux linkage with at least one magnet to move the rotor in a direction across tracks on the storage medium, and the second coil being operatively coupled to at least one magnet so that current in the second coil alters magnetic flux linkage with at least one magnet to move the rotor to adjust the fly height.

2. The data storage device of claim 1, wherein the at least one magnet is a four-block Halbach magnet array having two vertically oriented blocks and two horizontally oriented blocks.

3. The data storage device of claim 2, wherein the first coil includes first and second legs adjacent alternate vertically-oriented blocks of the array and the second coil includes first and second legs adjacent alternate horizontally-oriented blocks of the array.

4. The data storage device of claim 3, wherein the four-block Halbach magnet array is supported by the rotor and the first and second coils are supported by the stator, current in the first coil alters magnetic flux linkage with the magnet array to move the rotor along a first axis and current in the second coil alters magnetic flux linkage with the magnet array to move the rotor along a second axis substantially orthogonal to the first axis.

5. The data storage device of claim 2, wherein the four-block Halbach magnet array is supported by the rotor and the first and second coils are supported by the stator, current in the first coil alters magnetic flux linkage with the magnet array to move the rotor along a first axis and current in the second coil alters magnetic flux linkage with the magnet array to move the rotor along a second axis substantially orthogonal to the first axis.

6. The data storage device of claim 1, wherein the at least one magnet comprises
   a sequence of at least first, second, third and fourth permanent magnet portions arranged so that the second portion is sandwiched between the first and third portions and the third portion is sandwiched between the second and fourth portions, the second and fourth portions each having opposite poles positioned vertically so that one of the poles confronts the stator and the other pole confronts the rotor and the second and fourth portions are oriented opposite to each other, the first and third portions each having opposite poles positioned horizontally so that one of the poles of the first portion confronts the second portion and the opposite poles of the third portion confront the second and fourth portions and the first and third portions are oriented opposite to each other, the first coil comprising
- a first leg confronting the first permanent magnet portion, and
- a second leg confronting the third permanent magnet portion, the first and second legs being opposite to each other so that current flowing in one direction in the first leg flows in the opposite direction in the second leg, and the second coil comprising
- a third leg confronting the second permanent magnet portion, and
- a fourth leg confronting the fourth permanent magnet portion, the third and fourth legs being opposite to each other so that current flowing in one direction in the third leg flows in the opposite direction in the fourth leg.

7. The data storage device of claim 6, wherein the sequence of first, second, third and fourth permanent magnet portions is supported by the rotor and the first and second coils are supported by the stator, current in the first coil alters magnetic flux linkage with the sequence of permanent magnet portions to move the rotor along a first axis and current in the second coil alters magnetic flux linkage with the sequence of permanent magnet portions to move the rotor along a second axis substantially orthogonal to the first axis.

8. A microactuator comprising a stator member, a rotor member, and an operator coupling the rotor member to the stator member to move the rotor member relative to the stator member, the operator comprising:
- at least one magnet supported by one of the stator or rotor members; and
- winding means supported by the other of the stator or rotor members for altering magnetic flux linkage with at least one magnet for independently moving the rotor member in at least two substantially orthogonal directions.

9. The microactuator of claim 8, wherein the at least one magnet is a four-block Halbach magnet array having two vertically oriented blocks and two horizontally oriented blocks.

10. The microactuator of claim 9, wherein the winding means comprises:
- first and second coils confronting the four-block Halbach magnet array and arranged to independently carry current.

11. The microactuator of claim 10, wherein the first coil includes first and second legs adjacent alternate vertically oriented blocks of the array and the second coil includes first and second legs adjacent alternate horizontally-oriented blocks of the array.

12. The microactuator of claim 11, wherein the four-block Halbach magnet array is supported by the rotor member and the first and second coils are supported by the stator member, current in the first coil alters magnetic flux linkage with the magnet array to move the rotor member along a first axis and current in the second coil alters magnetic flux linkage with the magnet array to move the rotor member along a second axis substantially orthogonal to the first axis.

13. The microactuator of claim 10, wherein the four-block Halbach magnet array is supported by the rotor member and the first and second coils are supported by the stator member, current in the first coil alters magnetic flux linkage with the magnet array to move the rotor member along a first axis and current in the second coil alters magnetic flux linkage with the magnet array to move the rotor member along a second axis substantially orthogonal to the first axis.

14. The microactuator of claim 8, wherein the at least one magnet comprises
- a sequence of at least first, second, third and fourth permanent magnet portions arranged so that the second portion is sandwiched between the first and third portions and the third portion is sandwiched between the second and fourth portions, the second and fourth portions each having opposite poles positioned vertically so that one of the poles confronts the stator and the other pole confronts the rotor and the second and fourth portions are oriented opposite to each other, the first and third portions each having opposite poles positioned horizontally so that one of the poles of the first portion confronts the second portion and the opposite poles of the third portion confront the second and fourth portions and the first and third portions are oriented opposite to each other, and the winding means comprises
- a first coil having a first leg confronting the first permanent magnet portion and a second leg confronting the third permanent magnet portion, the first and second legs being opposite to each other so that current flowing in one direction in the first leg flows in the opposite direction in the second leg, and
- a second coil having a third leg confronting the second permanent magnet portion and a fourth leg confronting the fourth permanent magnet portion, the third and fourth legs being opposite to each other so that current flowing in one direction in the third leg flows in the opposite direction in the fourth leg.

15. The microactuator of claim 14, wherein the sequence of first, second, third and fourth permanent magnet portions is supported by the rotor member and the first and second coils are supported by the stator member, current in the first coil alters magnetic flux linkage with the sequence of permanent magnet portions to move the rotor member along a first axis and current in the second coil alters magnetic flux linkage with the sequence of permanent magnet portions to move the rotor member along a second axis substantially orthogonal to the first axis.

* * * * *